Dec. 24, 1935.  W. S. THOMAS  2,025,256
WATER HEATER
Filed Jan. 20, 1934  2 Sheets-Sheet 1

Inventor
William S. Thomas
By Cameron, Kerkam & Sutton.
Attorneys.

Dec. 24, 1935.  W. S. THOMAS  2,025,256
WATER HEATER
Filed Jan. 20, 1934  2 Sheets-Sheet 2

Inventor
William S. Thomas.
By Cameron, Kerkam & Sutton.
Attorneys

UNITED STATES PATENT OFFICE 2,025,256

WATER HEATER

William S. Thomas, Montoursville, Pa., assignor of one-half to E. W. Heckert, Montoursville, Pa.

Application January 20, 1934, Serial No. 707,583

1 Claim. (Cl. 122—14)

This invention relates to water heaters, and more particularly to heaters of the storage type utilizing gas as the heating medium.

In water heaters of this character, especially those which are intended for family use, it is highly important that the cost of operation be relatively low, and be maintained low over periods of long service, and that they also be capable of a relatively quick recovery. That is, when the supply of hot water in the storage tank has been drawn off, the new supply of relatively cold water should be quickly and efficiently raised to the desired temperature without excessive losses in the amount of heat generated by the burners. However, in the heaters hitherto known to the art, these desiderata have been difficult of concurrent attainment. Low operating cost and a capability for quick recovery have been previously considered dependent upon conflicting factors between which a compromise has been necessary. For example, in order to insure rapid heating of a fresh charge of relatively cold water, it has been the custom in many of the prior heaters to increase the rate of combustion of gas to a point where far more heat units are produced in a given time than can be transmitted to and absorbed by the water in the tank, with a consequent waste of heat and an increase in operating cost.

Difficulty has also been encountered with various water heaters now on the market because of the relatively large amounts of heat which are lost in the vented gases of combustion and by transmittal through conduction, radiation and convection to parts of the heater structure not in contact with the water to be heated. Convection currents in the combustion chamber constitute a substantial source of heat losses of this character. Much heat is also lost in existing types of heaters because of the failure to provide a construction which is capable of transmitting heat from the combustion chamber to the contents of the tank as rapidly as that heat is generated by the burners.

It is therefore one of the objects of the present invention to provide a water heater of novel construction which is not only simple in construction and economical of manufacture but also highly efficient in operation.

Another object is to provide a new and improved water heater of the storage type which is capable of both quick recovery and low operating costs over long periods of service.

A further object is to provide a storage water heater embodying a novelly constructed combustion chamber and tank bottom which presents a relatively large area of highly heat conductive material between the products of combustion and the water and thus renders the heater capable of a relatively rapid transfer of heat from the chamber into the water, thereby reducing the time of flame propagation necessary for a given temperature rise of the water in the tank.

Another object is to provide a new and improved tank bottom and combustion chamber for water heaters which not only increases the efficiency with which heat is transferred from the chamber to the contents of the tank but also materially reduces the heat losses due to convection currents in the chamber.

Still another object is to provide a water heater of the character described wherein the heat unit production of the burners is scientifically balanced with the heat transfer and absorption through the tank bottom so that the heat loss as measured by the difference between the available B. t. u. in the products of combustion and the B. t. u. absorbed by the water is reduced to a minimum.

A still further object is to provide a storage water heater embodying both the novel form of tank bottom and combustion chamber described and a tempering chamber or reservoir in which a charge of relatively cold water may be preheated by conduction from the water in the storage tank before passing into said tank, thereby increasing the speed of recovery of the heater— that is, decreasing the time of flame propagation necessary to restore the temperature of the water in the tank to the desired degree after some of the hot water has been withdrawn.

Another object is to provide a water heater of the character described wherein the heat losses due to convection currents in the combustion chamber are materially reduced by directing and substantially confining the burner flames to the inner concave portions of a plurality of dome-shaped heat traps or pockets formed in the bottom of the heater tank.

These and other objects will appear more fully from a consideration of the detailed description of the invention which follows. Although only one embodiment of the invention has been described and illustrated in the accompanying drawings, it will be understood that these drawings are for purposes of illustration only and are not to be construed as defining the scope of the invention, reference being had for this purpose to the appended claim.

Referring now to the drawings, wherein like reference characters indicate like parts throughout the several views.

Figure 1:
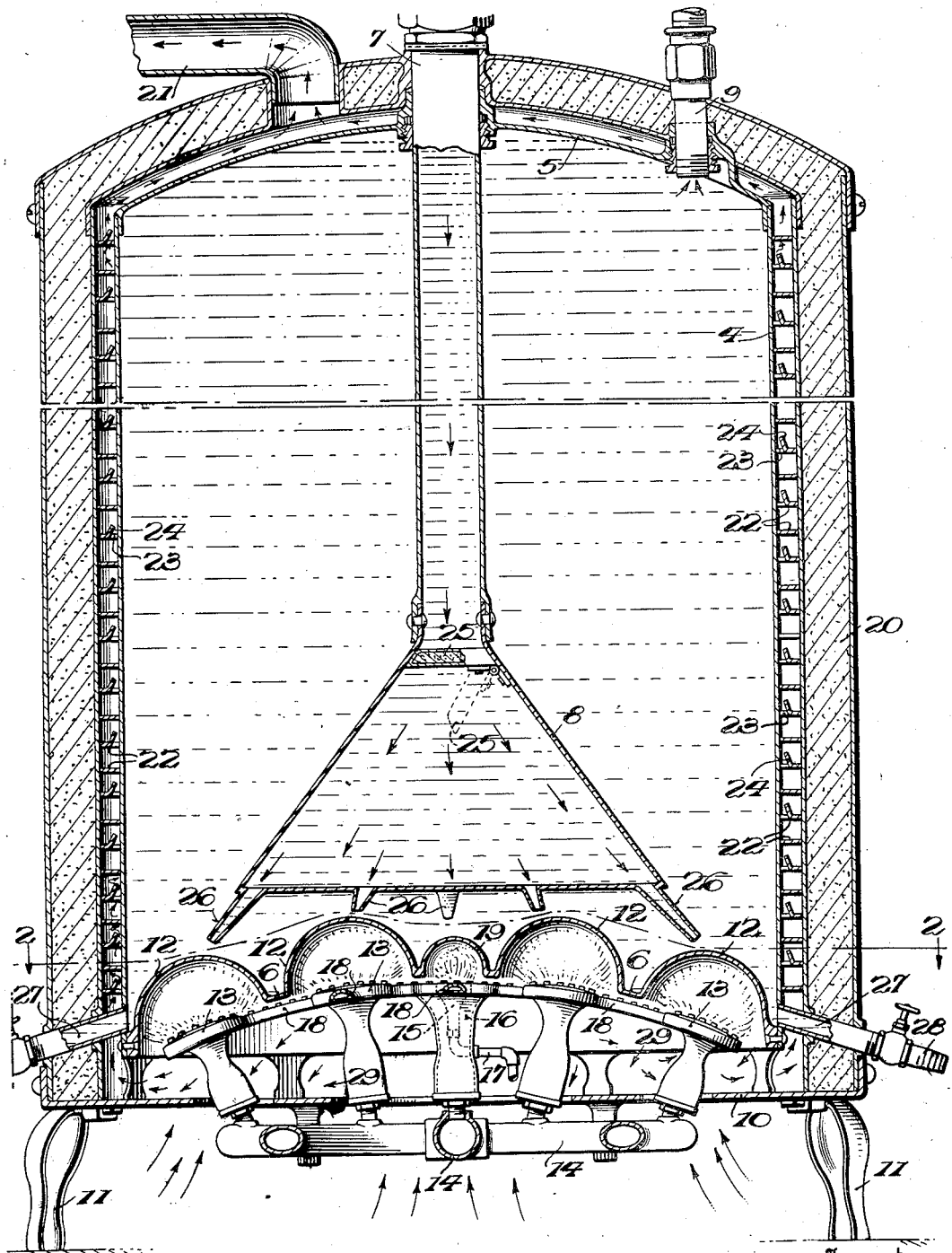
Fig. 1 is a vertical longitudinal section, with certain parts broken away, of a gas water heater of the storage type illustrating one embodiment of the present invention.

There is shown in Fig. 1 of the drawings a gas water heater of the storage type in which are embodied those novel features of the present invention whereby the above mentioned objects are attained. As shown, the heater comprises a substantially cylindrical storage and heater tank 4 having a suitable top 5 and a generally dome-shaped bottom 6. Although the tank may be constructed in any suitable manner, simplicity and economy of manufacture may be furthered by forming the top 5 and bottom 6 as individual castings and securing them to the cylindrical wall of the tank in any desired manner, as by riveting or welding. While any non-corrosive, heat conductive metal is suitable for the tank, it has been found that when aluminum is used, particularly for the bottom casting 6, relatively high efficiency as respects heat transfer is obtained while at the same time the cost of manufacture remains relatively inexpensive.

The tank 4 is also provided with a suitable supply or inlet pipe 7 through which relatively cold water may be fed to the interior thereof, either directly or through a tempering reservoir or chamber 8 later to be described. Hot water may be drawn from the tank through a suitable outlet pipe 9. The cylindrical wall of tank 4 may extend downwardly below dome-shaped bottom 6 and rest upon a bottom supporting plate 10 which in turn may be provided with a plurality of suitable ground-engaging legs or feet 11.

The bottom 6 of tank 4, which also forms the top of the combustion chamber of the heater, is especially constructed in a new and improved manner not only to insure a relatively rapid transfer of heat from the combustion chamber to the water within the tank but also to reduce to a minimum the heat losses which are occasioned by convection currents in the combustion chamber. To this end, the main dome of bottom 6 is provided with a plurality of spaced, auxiliary domes 12 which extend upwardly into the tank with their upper convex surfaces well above the level of the muck or sediment which normally forms in the bottom of water heaters of this general type. Although twelve of these auxiliary domes have been shown in the accompanying drawings, it will be understood that the invention is not limited to any specific number or arrangement thereof so long as the desired objects of efficient heat transfer and minimization of convection losses are attained.

In connection with this feature of increased rapidity of heat transfer to and absorption by the water in the tank, it will be noted that, even in the absence of the self-cleaning and scouring feature later to be described, the provision of bottom 6 with a plurality of auxiliary domes 12 insures that there will always be a relatively large surface of highly heat conductive material in direct contact with the water in the tank above the level of the normal muck line in the bottom thereof.

As is pointed out above, the bottom 6 of storage tank 4 also forms the top of the combustion chamber of the heater, the bottom and sides of which are constituted by supporting plate 10 and the lower end of the cylindrical wall of tank 4, respectively. Supporting plate 10 is preferably perforated as shown to admit air to the combustion chamber. Within the combustion chamber there is provided suitable means for producing the heat which is to be transmitted, primarily through bottom 6, to the water within the storage tank. In the embodiment illustrated, the heating means comprise a plurality of interconnected gas burners 13 each of which is mounted directly beneath one of auxiliary domes 12 with its gas ports so constructed and arranged as to direct the products of combustion against the lower concave surface of said dome. As is shown best in Fig. 1, each of domes 12 is substantially hemispherical and its associated burner 13 is preferably located substantially in the center of the plane of the lower edge of the dome. With this construction the flame from each of burners 13 is substantially confined to the interior of its associated dome 12 with the result that the gases of combustion remain trapped under the dome, practically unaffected by convection currents within the combustion chamber below the plane of the burner, during the transfer of a relatively large proportion of the heat units from said gases through the bottom 6 to the water within tank 4. At the same time, the hemispherical shape of the domes is extraordinarily well adapted to produce convection currents of the products of combustion within the domes so that efficient scavenging takes place without smothering of the flames, the products of combustion flowing outwardly and downwardly from the zeniths of the domes to the lower edges thereof without interfering with the upwardly directed flames or the supply of combustion supporting air.

The relatively high efficiency of heat transfer afforded by this construction also makes possible the use of a relatively low flame at each of burners 13. While it is true that with a low flame the number of heat units generated per unit time is less than with a higher flame, the heat traps or pockets formed by auxiliary domes 12 and their relatively large conductive surfaces provide a greater opportunity for heat transfer than is given in water heaters hitherto known to the art, with the result that the rate of combustion in the present heater can be governed so as to generate substantially only as must heat as can be efficiently transmitted to and absorbed by the water in the tank through the bottom and sides thereof.

Although the specific arrangement and construction of gas burners 13, aside from their relation to domes 12, form no part of the present invention, it is preferable that each burner be provided with an individual connection to a gas supply main 14 the flow of gas in which may be controlled in any suitable manner. These connections may, as shown, extend downwardly through the air holes in supporting plate 10 to a main 14 located below said plate. A pilot burner 15 is also provided and is preferably located in the center of a ring 16 which is connected to supply main 14 and provided with gas ports in its upper surface. Pilot burner 15 may be constantly supplied with gas through a separate connection 17 in the usual manner. Ring 16 is in turn connected to the various main burners 13 by conduits 18 each of which is also provided with suitable gas ports in the upper surface thereof. When gas is supplied to main 14, that issuing from the ports in ring 16 is first ignited by pilot burner 15 and then transmitted by means of conduits 18 to the various main burners 13.

If desired, bottom 6 of the heater tank may be provided with a small dome 19, similar to domes 12, directly above pilot burner 15 and ring 16. Such a construction renders even the relatively small amount of heat produced by the pilot flame available for maintaining the temperature of the water in tank 4 when the main burners are not in operation.

In order to prevent heat losses by radiation from the heater tank, and in order to extract some of the heat which remains in the gases of combustion at the time that they leave the combustion chamber beneath the tank, it is customary in water heaters of this general character to enclose the top and sides of the tank in a casing of suitable insulating material, and to vent the gases of combustion to the atmosphere through the space between the tank and the insulating casing. In the form shown, tank 4 is provided with a surrounding casing 20 of any suitable insulating material, which casing is spaced from the side wall and top of tank 4 and is secured at its lower end to and supported by supporting plate 10. Casing 20 is also provided at the top thereof with a vent pipe 21, this vent together with the space between casing 20 and tank 4 forming a flue through which the gases of combustion are led from the combustion chamber to the atmosphere, the communication between the combustion chamber and the flue being through a plurality of openings 29 formed in the lower edge of the side wall of tank 4.

While the flue construction thus described provides additional opportunity for the extraction of heat from the gases of combustion before finally exhausting them to the atmosphere, it has been found that the efficiency of the heater can be increased if the flow of the gases through such a flue is retarded and if all of the gases can be made to come into repeated intimate contact with the wall of the heater tank. The structure disclosed therefore includes a novel arrangement of baffles which are interposed in the space between the walls of tank 4 and insulating casing 20 in such a way as to cause the gases to follow a tortuous path and to repeatedly come into intimate contact with the wall of said tank.

Figure 2:
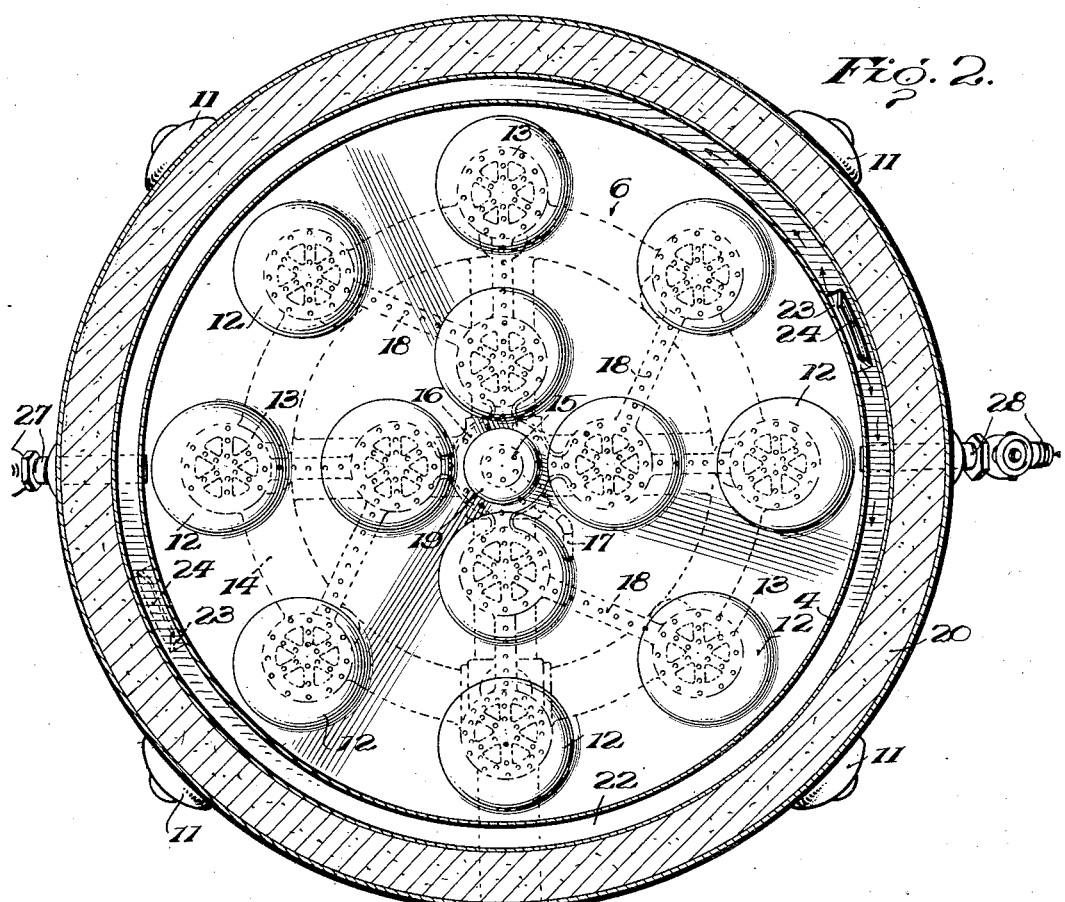
Fig. 2 is a horizontal sectional view taken substantially on line 2—2 of Fig. 1.
Figure 3:
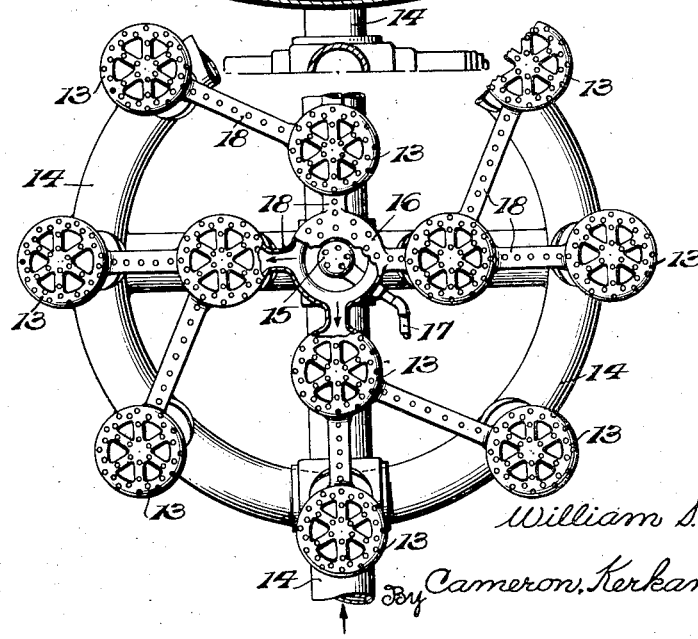
Fig. 3 is a plan view of the burner arrangement of the heater shown in Figs. 1 and 2.

In the form illustrated in Figs. 1 and 2, a plurality of annular baffle rings 22, each of a width substantially equal to that of the space between the walls of tank 4 and casing 20, and having a frictional fit therewith, are superposed one above the other in said space. Each baffle ring 22 is provided with a port 23 of relatively small circumferential amplitude formed adjacent the inner edge thereof, the ports in adjacent plates being staggered in any suitable manner, as by locating them at diametrically opposite points with respect to tank 4. Each port 23 is preferably provided by cutting baffle ring 22 outwardly from two circumferentially spaced points on the inner edge thereof and then bending upwardly the deflecting lip 24 thus formed so as to make an acute angle with respect to the vertical wall of tank 4. With baffle rings and ports of this construction, the gases leaving the combustion chamber are forced to travel in a circuitous path around tank 4 in their passage to vent 21, and in passing through each port 23 are forced by deflector lip 24 into intimate, wiping contact with the wall of tank 4. The retardation in the flow of the gases thus provided is sufficient to permit substantially complete absorption by the water in tank 4 of all of the heat units remaining in the gases, instead of allowing this heat to be lost to the atmosphere.

As has previously been pointed out, the incoming relatively cold water may be fed directly to the interior of tank 4 through supply pipe 7. However, it is preferable that it be first led to a tempering chamber or reservoir within the tank wherein it may be preheated by conduction by the surrounding hot water in the storage tank. The present invention therefore includes a tempering reservoir 8 of novel construction which not only functions as a preheating chamber and thereby reduces the time required by the heater for recovery, but also is so constructed and arranged as to render the heater tank self-cleaning and capable of automatically preventing the accumulation of large amounts of sediment or muck in the bottom thereof. In the form shown, tempering reservoir 8 consists of a hollow, frusto-conical casting secured at its upper end to and supported by the lower outwardly expanded end of supply pipe 7. Reservoir 8 is thus supported centrally within tank 4 with its bottom closely adjacent the upper surfaces of auxiliary domes 12.

Relatively cold water is supplied to tempering reservoir 8 through pipe 7, the connection therebetween being controlled by a suitable insulating valve 25. It is the purpose of valve 25 to retard or inhibit the transfer of heat from the water within tempering reservoir 8, which is heated by conduction from the surrounding hot water in tank 4, to the relatively cold water in inlet pipe 7, and to thereby minimize the stand-by loss which would otherwise occur if these two bodies of water were in direct contact. To this end, valve 25 is so constructed as to have a relatively low capacity for heat conduction, the valve shown comprising a body or core of a suitable insulating material, such as cork, either impregnated or coated so as to be non-absorbent of water or provided with a suitable water-tight casing. Valve 25 may be mounted in any suitable manner so as to remain closed when tank 4 and tempering reservoir 8 are full of water but to open under the pressure of the water in inlet pipe 7 whenever water is drawn from reservoir 8 into tank 4, as when hot water is drawn off through outlet pipe 9. So long as the body of the valve is constructed of a buoyant material, such as cork, it is only necessary to pivot the valve to the upper end of reservoir 8 as shown, or to mount it upon a vertical spindle, and to permit it to seat itself against the conical seat provided by the upper end of reservoir 8.

In order that the water which is tempered or preheated within reservoir or chamber 8 may be supplied to tank 4 to replenish the charge therein whenever hot water is drawn off through outlet pipe 9, the bottom of reservoir 8 is provided with a plurality of downwardly extending nozzles 26, preferably equal in number to the number of auxiliary domes with which tank bottom 6 is provided, the lower end of each of said nozzles being located very close to the upper surface of one of said domes. This arrangement of nozzles is such that, when hot water is withdrawn from tank 4 through outlet pipe 9, the pressure of the water in inlet pipe 7 and reservoir 8 forces a stream of water out of each of nozzles 26, the turbulent effect of which streams impinging upon domes 12 and dome 19 is to create a scouring current of water over said domes and the bottom 6, effectually cleaning the same and minimizing the formation of an insulating deposit of sediment or muck between the water in tank 4 and the heat conducting portions of the tank bottom. What sediment or muck may form in the bottom of tank 4 is washed off to the periphery of dome-shaped bottom 6 where it may be drawn off at will through suitable drain pipes 27. If desired, one or more of drain pipes 27 may be provided with a hose coupling 28 for connection to a source of water under high pressure for cleaning out muck which is not readily removed by ordinary draining.

In the event that it should not be desired to use a tempering reservoir 8, the lower end of water supply pipe 7 may be provided with scouring nozzles similar to those just described; or, as has been previously pointed out, even without such means, the upper surfaces of auxiliary domes 12 will remain highly heat conductive since they lie well above the normal level of any muck which may form on main dome 6.

Although it is believed that the operation of the water heater forming the subject matter of the present invention is obvious from the preceding description of its construction, its cycle may be summarized as follows: Assuming that tank 4 is full of water which has been heated to the desired degree and that main burners 13 are not in operation (the flow of gas in main 14 having been cut off in any suitable manner), pilot burner 15 remains burning directing its products of combustion against the lower concave surface of dome 19, thereby continuously adding a small amount of heat to the water within the tank. At this time tempering reservoir 8 and supply pipe 7 are also full of water, insulating valve 25 being closed due to its property of flotation, and the water within reservoir 8 gradually becomes preheated or tempered by conduction from the surrounding hot water in tank 4. When a quantity of hot water is drawn off from tank 4 through outlet pipe 9, valve 25 opens and the preheated water within tempering reservoir 8 is forced downwardly through scouring nozzles 26 and causes a turbulent flow of water over and around domes 12 and 19 and the main dome surface of bottom 6 so as to scour away any accumulation of muck or sediment which may have gathered thereon and to wash it downwardly to the outer periphery of bottom 6, whence it may be removed at will through drain pipes 27.

The addition to tank 4 of the relatively cool water from tempering chamber 8 reduces the temperature of the water in the tank to the point where additional heat is required, whereupon the main gas supply is opened and main burners 13 become ignited from pilot 15 through ring 16 and conduits 18. Due to the positioning of burners 13 at the centers of hemispherical domes 12, the products of combustion of said burners are directed against and substantially entrapped within the concave portions of said domes for a sufficient period of time to ensure a proper transfer of heat therefrom to the contents of the tank. Due to the relatively large conductive area afforded by domes 12, and since these dome surfaces are free from any insulating coating of muck or sediment, the heat transfer from the entrapped products of combustion within domes 12 to the water in tank 4 is relatively rapid, particularly when the bottom of the tank is constructed of a material, such as aluminum, which possesses a high coefficient of heat conductivity. Moreover, since the water which is supplied to tank 4 has been tempered or preheated in reservoir 8, the time required for raising it to the desired temperature in tank 4 is shorter than it would be if the new charge were added directly from inlet supply pipe 7. The recovery time of the heater is thereby decreased. At the same time, since the gases of combustion are substantially entrapped beneath domes 12, the convection currents through the lower part of the combustion chamber have relatively little effect in carrying the hot gases away from the heat conductive portions of the tank bottom to be wasted in heating parts of the structure not in contact with the water in the tank or in passing through the flue to the atmosphere.

After sufficient water has been supplied from reservoir 8 and pipe 7 to completely fill tank 4, and when reservoir 8 is again filled with relatively cold water from pipe 7, valve 25 floats to its closed position and the heating continues until the water in tank 4 again reaches the desired temperature, whereupon the main burners 13 may be cut off.

The gases of combustion which gradually pass from beneath domes 12 travel through openings 29 into the flue between tank 4 and insulating casing 20. The passage of these gases through the flue, however, is substantially retarded by annular baffle rings 22 and their staggered ports 23, and they are forced into repeated intimate engagement with the wall of tank 4, so that still more heat is extracted from these gases by the water in the tank before they pass through vent 21 to the atmosphere.

There is thus provided by the present invention a water heater of new and improved construction which is simple in structure, highly efficient in operation and especially well adapted for installations where constantly low costs of operation over periods of long service without expert supervision are essential. Due to the novel construction of the bottom of the heater tank, which also forms the top of the combustion chamber, a high rate of heat transmission is attained accompanied by a decrease in heat losses due to convection currents in the combustion chamber. Quick recovery is also insured by the provision of a tempering chamber or reservoir of substantial capacity wherein the incoming charge of water may be preheated before it is supplied to the main heater tank. Such a heater is characterized by a scientific balance between heat unit production and the time required for heat unit transfer to and absorption by the water without impairment of the capability for quick recovery, and is therefore a material improvement over devices of the same general character hitherto known to the art.

Although but a single example of the present invention concept has been disclosed, it will be obvious that the invention is not limited to the apparatus shown in the drawings, but is capable of a variety of mechanical embodiments. For example, any suitable heat producing means may be substituted for the specific form of gas burners shown, which means may be controlled either manually or automatically in any manner known to the art. Likewise, the number, size and arrangement of burners and auxiliary domes may be varied to suit the requirements of any particular installation. Various other changes, which will now appear to those skilled in the art, may be made in the form, details of construction and arrangement of the parts without departing from the spirit of the invention, and reference is therefore to be had to the appended claim for a definition of the limits of the invention.

This application is a division of application Serial No. 684,904, which issued January 23, 1934, as Patent No. 1,944,817.

What is claimed is:

In a water heater, a tank, a combustion chamber below the tank including an imperforate metallic wall of high heat conductivity forming both the top of the combustion chamber and the bottom of the tank, said wall having formed integrally therewith a plurality of spaced, hollow, substantially hemispherical domes extending upwardly therefrom into the tank, a main burner having a plurality of interconnected sections disposed in said combustion chamber, said burner sections corresponding in number to said domes and being so constructed and arranged that one section is located under each dome substantially in the plane of the lower edge thereof so that its products of combustion are directed against and substantially trapped under the lower concave surface thereof, whereby heat unit production may be substantially balanced with heat unit transfer to and absorption by the contents of said tank and heat losses due to convection currents in the combustion chamber may be minimized, a pilot burner centrally located with respect to said main burner, and an auxiliary dome formed in said wall and surmounting said pilot burner, whereby the heat produced by said pilot burner may be transmitted to the contents of said tank and tend to maintain the temperature thereof when the main burner is not in operation.

WILLIAM S. THOMAS.